Sept. 9, 1941.  B. G. HARRIS  2,255,355
INJECTOR VALVE-ACTUATOR
Filed Oct. 22, 1940   2 Sheets-Sheet 2
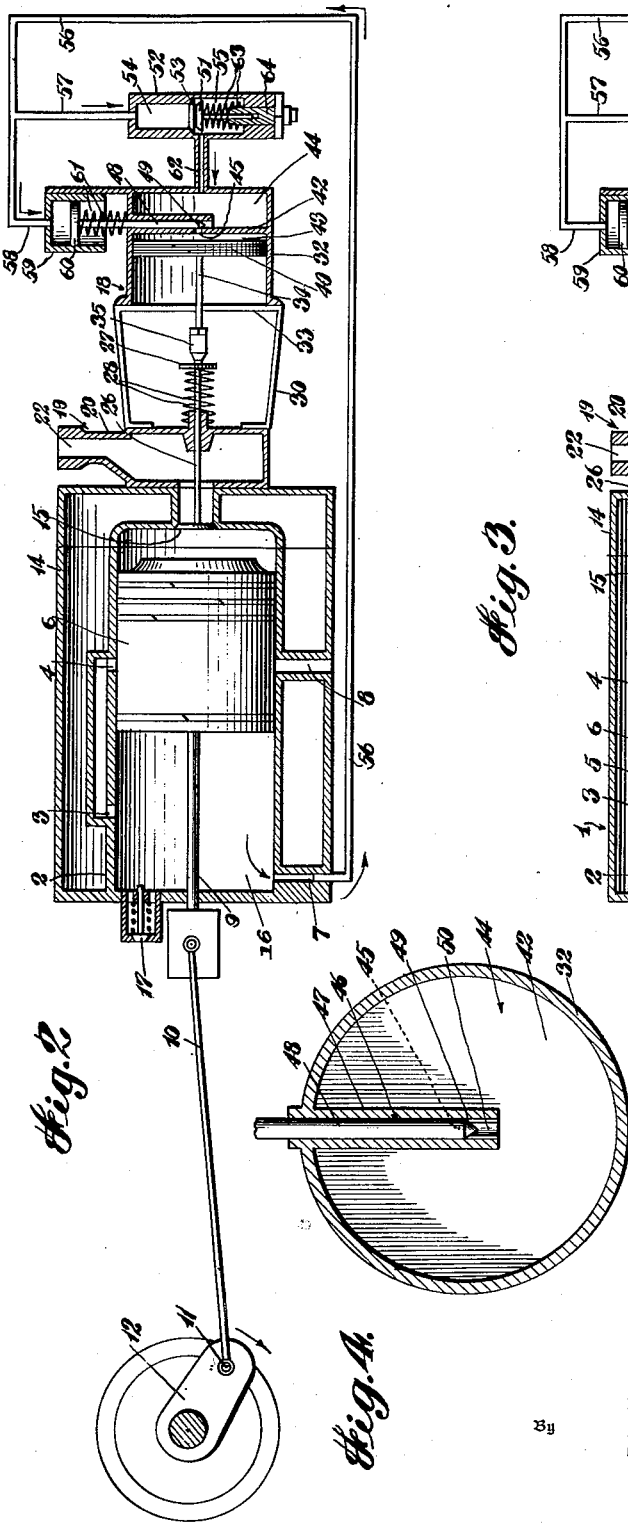
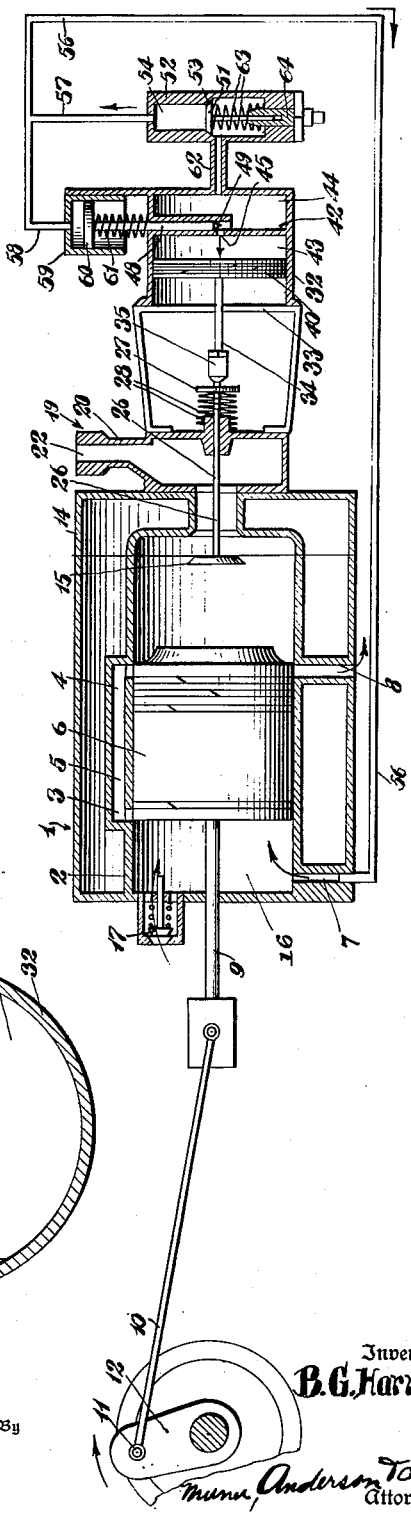
Inventor
B.G.Harris.

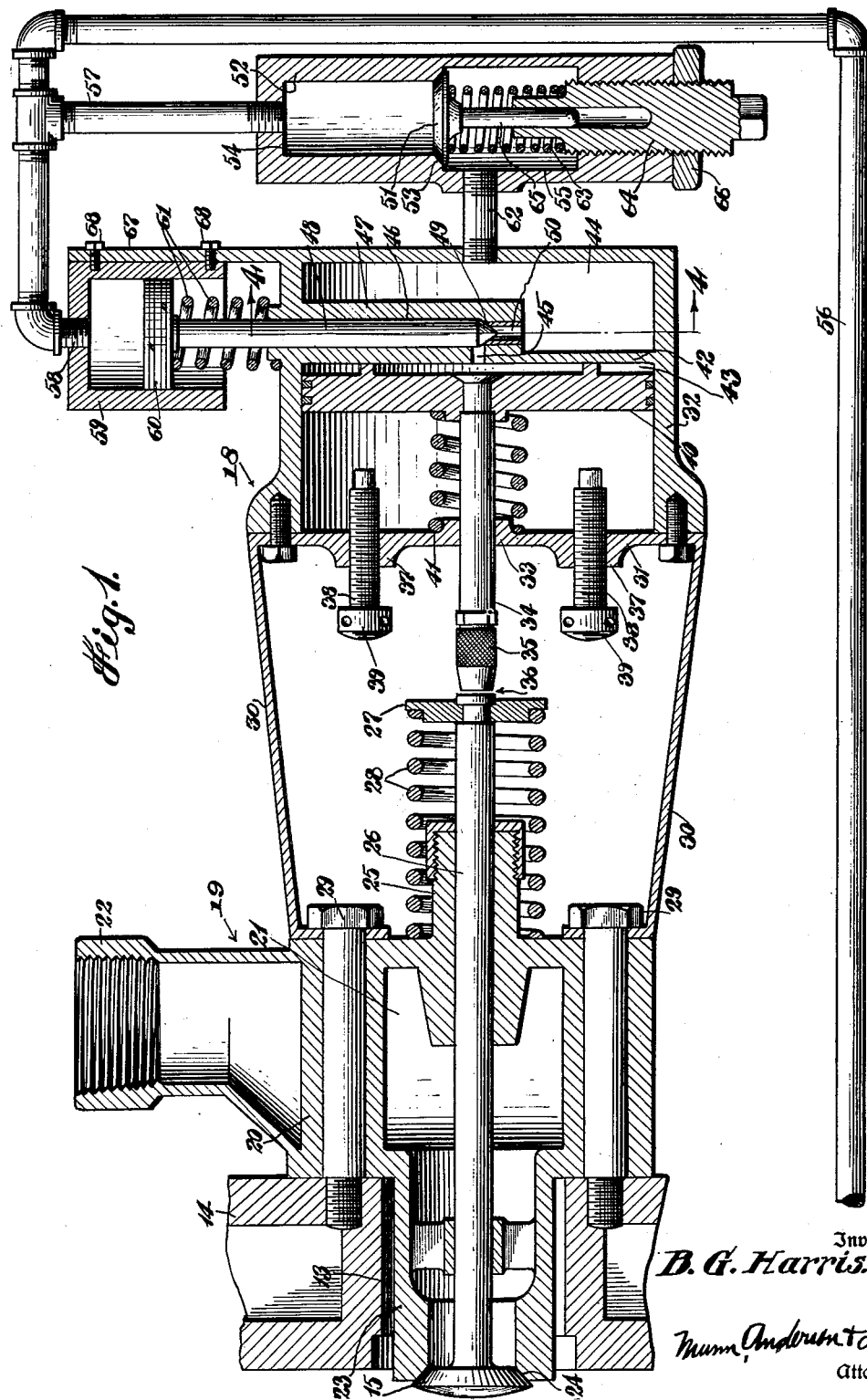

Patented Sept. 9, 1941

2,255,355

UNITED STATES PATENT OFFICE 2,255,355

INJECTOR VALVE-ACTUATOR

Barnie G. Harris, Pampa, Tex., assignor of one-half to Jones-Everett Machine Co., Pampa, Tex., a copartnership composed of Monrowe W. Jones and Charles H. Everett Application October 22, 1940, Serial No. 362,269

7 Claims. (Cl. 123—92)

This invention relates to improvements in internal combustion engines but more specifically to the apparatus for introducing combustible charges. For this purpose an injector valve is employed, and in order that the latter may be effectively operated to accord with the principles of the invention use is made of a novel injector valve operating mechanism which is so contrived as to enable the employment of successive compression and vacuum factors occurring in the engine itself, for the purpose of operating the herein denominated injector valve-actuator. With this preamble in mind the objects of the invention are as follows:

First, to provide an actuating mechanism which is specifically intended for use in conjunction with the injector valve of a natural gas engine.

Second, to utilize as the activating medium of an injector valve-actuator, the successive air compression and partial vacuum occurring in the operation of a 2-cycle engine for the periodic introduction of charges of natural gas on which said engine is run.

Third, to provide an actuating mechanism for the injector valve of a gas engine of the foregoing type, the operation of which is entirely automatic because of its dependence upon the occurrence of certain natural functions of the gas engine with which it is inseparably related.

Other objects and advantages will appear in the following specification, reference being had to the accompanying drawings, in which:

Figure 1 is a longitudinal section of the actuating mechanism, illustrating its association with the injector valve which it is adapted to operate.

Figure 2 is a diagrammatic section illustrating the position of the injector valve-actuator at the substantial beginning of the working stroke of the engine.

Figure 3 is a similar view illustrating the position of the parts during the compression stroke of the engine.

Figure 4 is a detail section taken on the line 4—4 of Fig. 1.

In order that the working of the valve-actuator may be understood to the best advantage it is thought desirable to first briefly describe the engine with which said actuator is used. The engine generally designated 1 is to be regarded as some known type which operates on natural gas and on the 2-cycle principle. The cylinder 2 has twin ports 3, 4, which are connected by a by-pass 5 collectively constituting a scavenging passageway.

These ports are under the control of the piston 6. Said piston also controls an air port 7 and an exhaust port 8. The rod 9 of the piston has eventual connection with a pitman 10 which, in turn, has a wrist-pin connection 11 with a crank 12 of the engine. An intake opening 13 in the head 14 of the engine has an inlet valve 15 associated with it in the manner disclosed in Fig. 1.

According to the characteristic operation of a 2-cycle engine, the outward or power strokes follow the inward or compression strokes in immediate succession, the uncovering of the exhaust port by the head of the piston 6 being accompanied by an uncovering of the substantially registering port 4 so that the previously burnt charge is expelled both by force of its own momentum and through the impetus given it by the charge of air compressed in the chamber 16 behind the piston on said outward stroke.

The return of the piston 6 to its inward stroke is accompanied by a refilling of the chamber 16 with air which is admitted by any suitable type of valve for example such as shown at 17. The refilling of the chamber 16 with air is accompanied by the setting up of a partial vacuum in the chamber 16. This vacuum and the previously described compression of air in said chamber constitute the mediums by which the valve actuator generally designated 18, is automatically operated in time with the engine 1.

Reference is next made to the details of the inlet valve 15 which together with its body is commonly designated the injector valve 19. The body specifically identified as 20 comprises a casting which is chambered at 21. This chamber has connection with a gas inlet 22 to which natural gas is piped. The chamber 21 also has communication with a cage 23, the internal rim of which is beveled to provide a seat 24 for the previously identified inlet valve 15. A guide 25 is included in the construction of the body 20 for the slidable support of the stem 26 of the valve 15.

A plate 27 is suitably affixed to the exposed terminal of the stem 26, providing the abutment for one end of a spring 28, the function of which is normally to keep the valve 15 closed. This function is accomplished by resting the other end of said spring against the body 20. Said body is bolted at 29 to the cylinder head 14, and these same bolts are used to secure the brackets 30 of the valve actuator 18. The description of the latter now follows in logical sequence, and by reference to Fig. 1 it is seen that said brackets 30 are the extensions of a plate 31 which constitutes the cover for the otherwise open end of a displacement cylinder 32. The cover 31 is intended to have an adequate and at the same time tight bearing at 33 for a plunger 34 which is slidable therein. The exposed end of said plunger carries an adjustable tappet 35, the extremity of which confronts the valve stem 26 with a proper clearance at 36 to periodically depress the stem 26 and open the valve 15.

Bosses 37 on the cover 31 carry stop screws 38 which are directed inwardly of the cylinder 32. They have conveniently accessible heads 39 with cross holes into chosen ones of which a steel rod is adapted to be inserted for the securement of an adequate leverage by which to adjust the screws.

Said screws act as stops for the displacement piston 40 which is affixed to the inner end of the plunger 34. A fairly heavy spring 41 located between the cover 31 and the piston 40 tends to keep said piston at the inner end of its stroke and closely adjacent to a partition 42 which divides the cylinder 32 into a chamber 43 for the piston and a chamber 44 in which charges of compressed air are adapted to be entrapped.

The partition 42 has a port 45 in permanent communication with the chamber 43 ahead of the piston 40 and with a bore 46 in an enlargement 47 on one side of the partition 42 of a size sufficient to accommodate a slidable stem 48. The inner terminal 49 of the stem 48 is tapered to comprise a valve. This valve is adapted to be seated upon the edge of an insert 50 in the inner end of the bore 46. In short, the valve 49 controls the egress of compressed air from the chamber 44 into the chamber 43, the occurrence of which function is responsible for unseating the valve 15 so that a charge of gas from the inlet 22 may enter the working chamber of the gas engine.

Successive charges of compressed air are stored in the chamber 44, or entrapped therein as previously stated, by the action of a check valve 51 in a casing 52. Said valve is adapted to be seated on a shoulder 53 which is formed by the bores 54, 55 of different diameters. These bores constitute chambers which are separated by the valve 51. A pipeline 56 from the air port 7 (Fig. 2) has laterals 57, 58 respectively connected with the casing 52 in communication with the chamber 54 and with a cylinder 59 in which is operable a piston 60 on the outer end of the stem 48. The valve end 49 of the latter tends to be unseated by a spring 61 which bears against the cylinder 32 and underneath the piston 60.

It will readily be apparent that when a charge of air is in the process of compression in the chamber 16 (Fig. 2) some of it will occupy the line 56 and both the chamber 54 and the cylinder 59 ahead of the piston 60. The result is the initial tight closure of the valve 49 and the progressively wider opening of the check valve 51 so that a charge of compressed air is built up in the chamber 55 for transfer to the chamber 44 by way of a connection 62. The spring 63 by which the valve 51 is tended to be seated is adjustable as to tension by a screw plug 64 which not only guides the stem 65 of the valve but also has thread engagement with the casing 52 so that the spring pressure can be regulated. A check nut 66 locks the adjustment of the plug 64. The cylinder 59 is supported in any appropriate way and in accordance with the showing in Fig. 1 use is made of a flange extension 67 from the cylinder 32 to which the cylinder 59 is bolted at 68.

The operation is readily understood. In Fig. 2 the piston 6 is to be regarded as moving on its power stroke. A previously admitted charge of atmospheric air is being compressed in the chamber 16 in readiness for escape into the working chamber by way of the scavenging passageway 5 when the port 4 of the latter is uncovered by the head of the piston.

But prior to the occurrence of the scavenging act and during the formation of the compressed charge a head of air is built up both in the chamber 54 and cylinder 59. Approximately two pounds of air pressure are sufficient to overcome the resistance of the spring 61. The result is the prompt closure of the valve 49. The maximum air compression in the chamber 16 is approximately fifteen pounds, and as this maximum is approached there will be a progressive increase in pressure in the chamber 44 by way of the check valve 51 until the piston 6 reaches the limit of its outward stroke.

When the piston 6 begins its return stroke it sets up a partial vacuum in the chamber 16, which although satisfied in part by the valve 17, is of a sufficient value to displace the piston 60 because of the suction influence of the piston 6. The effect upon the piston 60 is an immediate inward movement thereof in respect to the cylinder 59 by means of the spring 61 beneath it so that the valve 49 is opened. The effect of the vacuum in the line 56 also was to allow the closure of the check valve 51. The entrapped charge of air at approximately fifteen pounds pressure in the chamber 44 is released by the opening of the valve 49 into the cylinder 32 ahead of the piston 40 where it causes a displacement of the piston to the left and an opening of the valve 15 (Fig. 3) for the admission of a charge of gas to the working chamber. This charge is compressed by the piston 6 during its inward stroke and when it is eventually fired that act is accompanied by a repetition of the sequences described above.

I claim:

1. A mechanical assemblage comprising an engine having a fuel injector valve, a working cylinder having a fluid conduit extended off therefrom, a piston reciprocable in the cylinder and periodically causing fluid compression and suction impulses in said conduit, and means coupled to the conduit responding automatically to said periodic impulses of both kinds to store compressed fluid with which to impress force upon the valve for its periodic opening.

2. A mechanical assemblage comprising an engine having a fuel injector valve, a working cylinder having a fluid conduit extended off therefrom, a piston reciprocable in the cylinder and causing alternate fluid compression and suction impulses in said conduit, and means coupled to the conduit, entrapping a given compressed fluid impulse and yielding to the next succeeding suction impulse to liberate the entrapped fluid impulse for the displacement of the injector valve in one direction.

3. A mechanical assemblage comprising an engine having a fuel injector valve, a working cylinder having a fluid conduit extended off therefrom, a piston reciprocable in the cylinder and causing alternate air compression and suction impulses in said conduit, and means coupled to the conduit, said means responding successively to the compressed air charges and suction impulses and consisting of valved means to store a lone compressed air charge, valve means held closed by force of the air pressure in said conduit to maintain the entrapment of said lone charge, and means responding to the suction impulse in said conduit following the formation of said lone charge to displace the second valve means and liberate said charge, and means against which said liberated charge is impinged for the displacement of the injector valve in one direction.

4. An injector valve-actuator comprising a plunger which is adapted to confront an injector valve stem, a chamber in which a lone charge of compressed air is adapted to be built up by the movement of an engine piston in one direction, said chamber having a port of egress for said charge, a valve having a stem extending therefrom, said valve closing the port during the building up of said charge, and means associated with the stem, responding to a suction impulse on the reverse stroke of said piston to open the valve for the escape of said charge at the port and its impingement upon the plunger for the displacement of the injector valve stem.

5. An injector valve-actuator comprising a plunger which at one end is adapted to confront an injector valve stem, a displacement chamber in which the other end of the plunger is exposed, a pressure chamber in which a compressed charge of air is adapted to be built up by the movement of an engine piston in one direction, said compression chamber having a port of egress communicable with the expansion chamber, a conduit branching from said engine and including at least two laterals, one of which supplies the compression chamber with its charge of air, a valve responding to air pressure from the other lateral during the formation of said charge to close the port and maintain the entrapment of said charge in the compression chamber, and a spring coupled to said valve but yielding to the superior pressure delivered at the second lateral, said spring however opening the valve upon the cessation of pressure from said second lateral and the setting up of a suction impulse thereat by the movement of said piston in the opposite direction, thereby liberating said charge for impingement against said other end of the plunger.

6. An injector valve-actuator comprising a displacement cylinder, a partition in said cylinder defining displacement and pressure chambers, said partition having a port providing for communication between the chambers, a displacement piston occupying the displacement chamber and having a plunger extending from the cylinder into confronting relationship with a valve stem, a check valve having a casing in communication at one side of the valve with the pressure chamber, a conduit having one lateral in communication with said casing at the other side of the check valve and also having a second lateral, said conduit being subject to alternate pressure and suction impulses, a valve for the port, having a stem terminating in a piston, a cylinder occupied by said valve piston and constituting the terminal of the second lateral, and a spring acting on the valve piston to tend to open the respective valve, but being subservient to superior air pressure to maintain the closure of said valve during the building up of a compressed charge in the pressure chamber from the conduit through the check valve.

7. A mechanical assemblage comprising a 2-cycle engine having a head, an injector valve having a body with an inlet for the admission of natural gas for the operation of said engine, a cylinder included in the engine having an air port, a conduit coupled at one end to said air port, an inlet valve incorporated in said body and adapted to open inwardly of the engine head, means coupled to the other end of the conduit responding to a pressure impulse delivered at said port by a movement of the engine piston in one direction to entrap a charge of pressure fluid, spring means subservient to said pressure impulse during the formation of said charge but becoming active to liberate said charge during a succeeding suction impulse in said conduit in a movement of the engine piston in the opposite direction, and displaceable means against which said liberated charge is impinged to displace the inlet valve inwardly of the engine head for the admission of a charge of natural gas.

BARNIE G. HARRIS.